United States Patent
Hirata et al.

(10) Patent No.: US 8,649,250 B2
(45) Date of Patent: *Feb. 11, 2014

(54) SERIES OF OPTICAL RECORDING MEDIA

(75) Inventors: Hideki Hirata, Tokyo (JP); Takashi Kikukawa, Tokyo (JP); Atsuko Kosuda, Tokyo (JP); Motohiro Inoue, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/032,274

(22) Filed: Feb. 22, 2011

(65) Prior Publication Data

US 2011/0205881 A1   Aug. 25, 2011

(30) Foreign Application Priority Data

Feb. 22, 2010  (JP) ................ 2010-035813

(51) Int. Cl.
  *G11B 7/24*  (2013.01)
(52) U.S. Cl.
  USPC ........................................ 369/275.1
(58) Field of Classification Search
  None
  See application file for complete search history.

(56) References Cited

U.S. PATENT DOCUMENTS

| | | | |
|---|---|---|---|
| 7,221,644 B2 | 5/2007 | Kobayashi et al. | |
| 7,948,853 B2 | 5/2011 | Fujita | |
| 2001/0008506 A1* | 7/2001 | Takeya et al. | 369/44.29 |
| 2009/0147652 A1* | 6/2009 | Fujita | 369/100 |
| 2009/0290478 A1* | 11/2009 | Shiono | 369/112.23 |
| 2011/0205882 A1* | 8/2011 | Hirata et al. | 369/283 |
| 2011/0206889 A1 | 8/2011 | Mitsumori et al. | |

FOREIGN PATENT DOCUMENTS

| | | |
|---|---|---|
| JP | 2002063738 A | 2/2002 |
| JP | 2003346379 A | 12/2003 |
| JP | 2008097694 A | 4/2008 |
| JP | 2009104717 A | 5/2009 |
| JP | 2009123265 A | 6/2009 |
| JP | 2009140552 A | 6/2009 |
| WO | 2010013321 A1 | 2/2010 |

OTHER PUBLICATIONS

Ichimura et al., "Proposal for a Multilayer Read-Only-Memory Optical Disc Structure", Applied Optics 45 (8):1794-1803 (2006).
Mishima et al., "150 GB, 6-Layer Write Once Disc for Blu Ray Disc System", Proc. of SPIE 6282 628201-1-628201-11 (2006).

* cited by examiner

*Primary Examiner* — Adam R Giesy
*Assistant Examiner* — Henok Heyi
(74) *Attorney, Agent, or Firm* — Porzio, Bromberg & Newman, P.C.

(57) ABSTRACT

A series of optical recording media is provided to reduce a burden on an optical pickup by introducing a standardized idea among a plurality of optical recording media. In the series of optical recording media, optical recording media are of a plurality of types, each optical recording medium including a plurality of planar recording and reading layers with no projections and depressions for tracking control, and a servo layer with projections and depressions for tracking control. The plurality of optical recording media have different numbers of stacked recording and reading layers, and the positions of the servo layers with respect to the corresponding light incident surfaces are standardized among the plurality of optical recording media.

9 Claims, 2 Drawing Sheets

SERIES OF OPTICAL RECORDING MEDIA

BACKGROUND OF THE INVENTION

1. Field of the Invention

The present invention relates to a series of optical recording media made by preparing optical recording media of a plurality of types, the optical recording medium including a plurality of recording and reading layers.

2. Description of the Related Art

Conventionally, optical recording media such as CD-DAs, CD-ROMs, CD-Rs, CD-RWs, DVD-ROMs, DVD-Rs, DVD+/−RWs, DVD-RAMs, Blu-ray Discs (BD) are widely used to view digital video contents and to record digital data. In the BD standard, which is one of the next generation DVD standards, the wavelength of the laser beam used for recording and reading is reduced to 405 nm, and the numerical aperture of an objective lens is set to 0.85. In optical recording media conforming to the BD standard, tracks are formed at 0.32 μm pitch. This enables 25 GB or more data to be recorded on and read from one recording and reading layer of such an optical recording medium.

It is expected that the size of video and data files will increase more and more in the future. Therefore, it is contemplated to increase the capacities of optical recording media by using a multiple stack of recording and reading layers. In the technologies for BD standard optical recording media reported by I. Ichimura et al., Appl. Opt., 45, 1974-1803 (2006) and K. Mishima et al., Proc. of SPIE, 6282, 62820I (2006), 6 to 8 recording and reading layers are provided to achieve ultra large capacities as much as 200 GB.

When a multiple stack of recording and reading layers is used in an optical recording medium, projections and depressions, such as grooves and lands, for tracking control are formed on each recording and reading layer, and therefore a stamper (a master die) must be used to form the projections and depressions each time a recording and reading layer is formed. Therefore, as the number of stacked layers increases, the number of times the stamper is used increases, and this may result in an increase in manufacturing cost.

In the technologies for optical recording media recently proposed in Japanese Patent Application Laid-Open Nos. 2002-63738, and 2009-104717, servo layers are provided separately from recording and reading layers, and information is recorded on each recording and reading layer using a recording laser beam while a tracking signal is obtained from a corresponding one of the servo layers using a servo laser beam. With such technologies, the recording and reading layers need not have projections and depressions (grooves) for tracking information, and a stamper need not be used for the recording and reading layers during manufacturing. This enables a significant reduction in cost.

In the optical recording medium disclosed in Japanese Patent Application Laid-Open No. 2002-63738 or 2009-104717, the number of stacked recording and reading layers should be changed according to storage capacity required. However, if various optical recording media of different numbers of stacked recording and reading layers are produced, an optical pickup responsible for recording and reading of information cannot know the positions of recording and reading layers and of a servo layer in a direction of the thickness of each optical recording medium.

To be more specific, in the optical recording medium disclosed in Japanese Patent Application Laid-Open No. 2002-63738 or 2009-104717, change in the number of the stacked recording and reading layers changes the position of the servo layer depending on the thickness of a spacer layer and the like. Thus, each time an optical recording medium is set in place, the focus of a recording laser beam should be caused to move in a focus direction to know the positions of each recording and reading layer and of the servo layer. Accordingly, it takes a long time for preparation of recording and reading.

In this optical recording medium, an aberration generated by a difference in thickness of spacer layers between the recording and reading layers is corrected by a beam expander of an optical system of the optical pickup, and then recording and reading to and from each recording and reading layer are realized. Meanwhile, the optical pickup places limitations on the allowable amount of aberration correction by itself. Accordingly, if an optical recording medium has a larger number of layers in the future, recording and reading layers may be set outside the allowable range of aberration correction. Thus, an optical pickup may not be able to conduct aberration correction properly. Likewise, setting of a servo layer outside the allowable range of aberration correction by the optical pickup also makes the servo layer completely unable to conduct tracking control which is the most important process of recording and reading.

SUMMARY OF THE INVENTION

The invention has been made in view of the above problems, and it is an object of the invention to provide a series of optical recording media that reduces a burden on an optical pickup by introducing a standardized idea among a plurality of optical recording media.

The present inventors have made extensive studies, and the above object is achieved by the following means.

To achieve the above object, the present invention provides a series of optical recording media with the optical recording media of a plurality of types each including a plurality of planar recording and reading layers with no projections and depressions for tracking control, and a servo layer with projections and depressions for tracking control, thereby recording information on the recording and reading layers while conducting tracking control by using the servo layer. In the series of optical recording media, the plurality of optical recording media have different numbers of stacked recording and reading layers, and the plurality of optical recording media have standardized positions of the servo layers with respect to the corresponding light incident surfaces.

In the series of optical recording media that achieves the above object, the positions of the recording and reading layers that are nearest the corresponding light incident surfaces, with respect to the corresponding light incident surfaces are standardized among the plurality of optical recording media.

In the series of optical recording media that achieves the above object, the positions of the recording and reading layers that are farthest from the corresponding light incident surfaces, with respect to the corresponding light incident surfaces are standardized among the plurality of optical recording media.

In the series of optical recording media that achieves the above object, the servo layer of the optical recording medium is disposed away from the corresponding light incident surface by a distance greater than that of the corresponding plurality of recording and reading layers.

In the series of optical recording media that achieves the above object, a first distance and a second distance different from the first distance are alternately defined as interlayer distances between adjacent ones of the plurality of recording and reading layers in each of the plurality of optical recording media.

In the series of optical recording media that achieves the above object, a track pitch of the projections and depressions for tracking control defined in the servo layer is twice a track pitch of recording marks to be recorded on the recording and reading layers.

The invention can provide a series of optical recording media that realizes reliable recording and reading by an optical pickup by introducing a standardized idea among a plurality of optical recording media.

DETAILED DESCRIPTION OF THE PREFERRED EMBODIMENTS

Preferred embodiments of the present invention will next be described with reference to the accompanying drawings.

Figure 1:
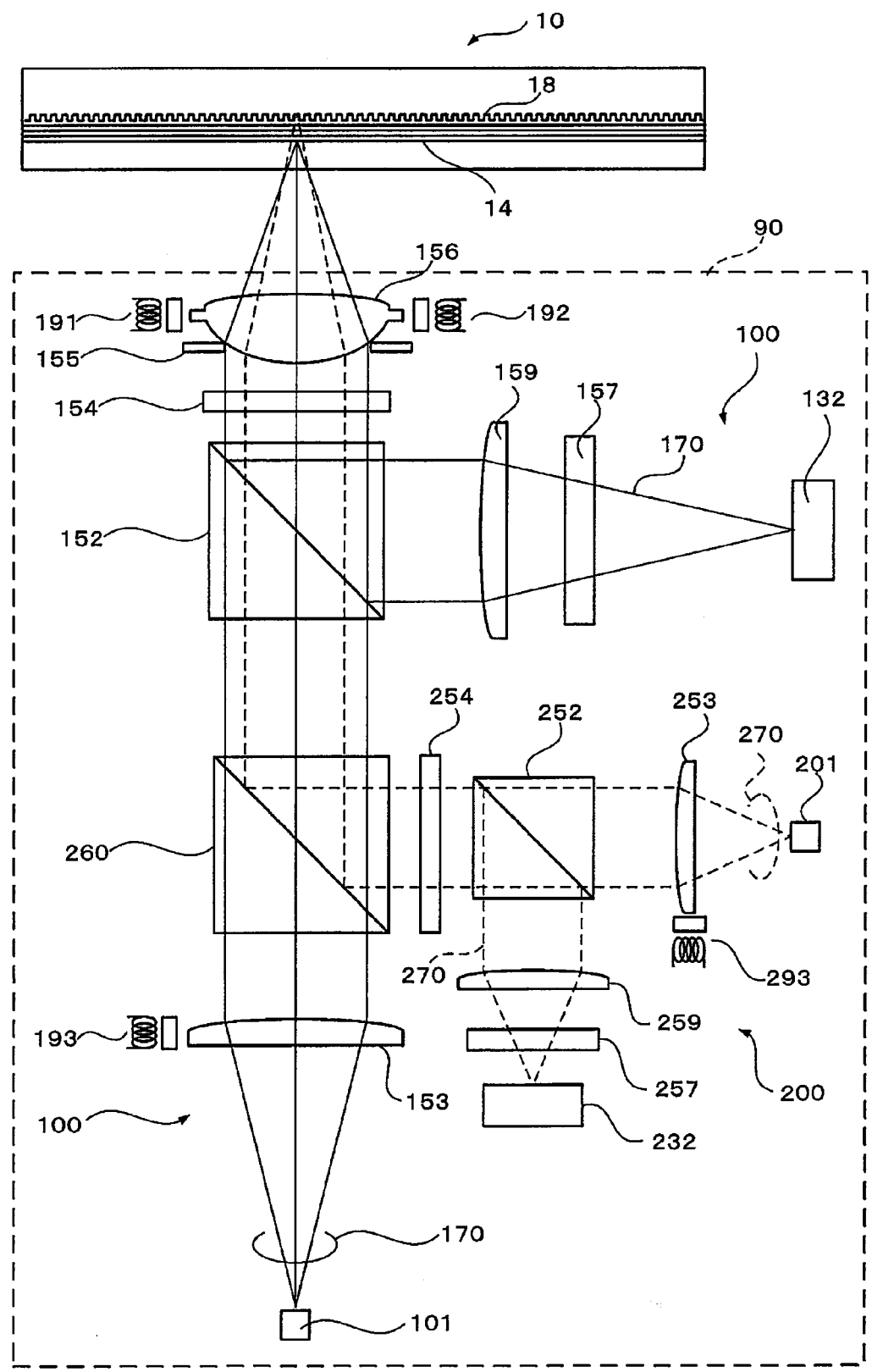
FIG. 1 is a block diagram of the structure of an optical pickup for recording and reading of a series of optical recording media according to a present embodiment.

FIG. 1 shows the structure of a first optical recording medium 10 belonging to a series of optical recording media according to the present embodiment and the structure of an optical pickup 90 used to record and read the first optical recording medium 10. The optical pickup 90 includes a first optical system 100 and a second optical system 200. The first optical system 100 is used to record and read a recording and reading layer group 14 in the first optical recording medium 10. The second optical system 200 is used for tracking control using a servo layer 18 (described later) when information is recorded on the recording and reading layer group 14 using the first optical system 100.

A diverging beam 170 emitted from a light source 101 of the first optical system 100 and having a relatively short blue wavelength (380 to 450 nm, 405 nm in this optical pickup) passes through a collimating lens 153 provided with spherical aberration correction means 193 and through a wavelength selection filter 260 of the second optical system 200 and enters a polarizing beam splitter 152. The beam 170 entering the polarizing beam splitter 152 passes therethrough and then through a ¼ wavelength plate 154 and is thereby converted to a circularly polarized beam. The circularly polarized beam is then converted to a converging beam through an objective lens 156. The resultant beam 170 is focused on one of a plurality of recording and reading layers in the recording and reading layer group 14 formed in the first optical recording medium 10.

The aperture of the objective lens 156 is restricted by an aperture stop 155 to set the numerical aperture NA to 0.70 to 0.90 (0.85 in this optical pickup). The beam 170 reflected from, for example, the recording and reading layer group 14 passes through the objective lens 156 and then through the ¼ wavelength plate 154 and is thereby converted to a linearly polarized beam with the polarization plane rotated 90° relative to that in the outward path. Then, the resultant beam is reflected from the polarizing beam splitter 152. The polarizing beam splitter 152 has wavelength selectivity. More specifically, the polarizing beam splitter 152 allows the beam 170 from the light source 101 of the first optical system 100 to be reflected therefrom but always transmits a beam 270 (described later) emitted from the second optical system 200 and having a relatively long red wavelength.

The beam 170 reflected from the polarizing beam splitter 152 passes through a condensing lens 159 and is thereby converted to a converging beam. The converging beam passes through a cylindrical lens 157 and is incident on a photodetector 132. When the beam 170 passes through the cylindrical lens 157, astigmatism is given to the beam 170.

The photodetector 132 has four light receiving units (not shown), and each of the light receiving units outputs a current signal according to the amount of light received. The current signals are used to generate a focus error (hereinafter abbreviated as FE) signal using the astigmatic method, a tracking error (hereinafter abbreviated as TE) signal using the push-pull method (the TE signal is generated only during reading), a reading signal of information recorded on the first optical recording medium 10, and other signals. The FE and TE signals are amplified to desired levels, subjected to phase compensation, and then supplied to actuators 191 and 192 as feedback to perform focus control and tracking control. The tracking control by the first optical system 100 is used only for reading.

The diverging beam 270 emitted from a light source 201 of the second optical system 200 and having a wavelength of 630 to 680 nm (650 nm in this optical pickup) passes through a collimating lens 253 provided with spherical aberration correction means 293 and enters a polarizing beam splitter 252. The beam 270 entering the polarizing beam splitter 252 passes therethrough and then through a ¼ wavelength plate 254 for the second optical system and is thereby converted to a circularly polarized beam. The circularly polarized beam is reflected from the wavelength selection filter 260 and passes through the polarizing beam splitter 152, which is shared with the first optical system 100. The beam 270 is then converted to a converging beam through the objective lens 156. The resultant beam 270 is focused on the servo layer 18 formed in the first optical recording medium 10. The beam 270 reflected from the first servo layer 18 passes through the objective lens 156 and then through the polarizing beam splitter 152 and is reflected from the wavelength selection filter 260 of the second optical system 200. The reflected beam 270 passes through the ¼ wavelength plate 254 and is thereby converted to a linearly polarized beam with the polarization plane rotated 90° relative to that in the outward path. Then, the resultant beam is reflected from the polarizing beam splitter 252. The beam 270 reflected from the polarizing beam splitter 252 passes through a condensing lens 259 and is thereby converted to a converging beam. The converging beam passes through a cylindrical lens 257 and is then incident on a photodetector 232. When the beam 270 passes through the cylindrical lens 257, astigmatism is given to the beam 270.

The photodetector 232 has four light receiving units (not shown), and each of the light receiving units outputs a current signal according to the amount of light received. The current signals are used to generate a focus error (FE) signal using the astigmatic method and a tracking error (TE) signal using the push-pull method. If information is recorded also on the servo layer 18, a reading signal is also generated.

When information is recorded on the recording and reading layer group 14 using the first optical system 100, the TE signal from the second optical system 200 is amplified to a desired level, subjected to phase compensation, and then supplied to the actuators 191 and 192 as feedback to perform tracking control. Therefore, the first optical system 100 records information on the recording and reading layer group 14 under the tracking control by the second optical system 200. In the present embodiment, when information recorded on the recording and reading layer group 14 is read, the first optical system 100 itself performs tracking control using recording marks on the recording and reading layer group 14. Of course, the information can be read under tracking control by the second optical system 200.

Figure 2:
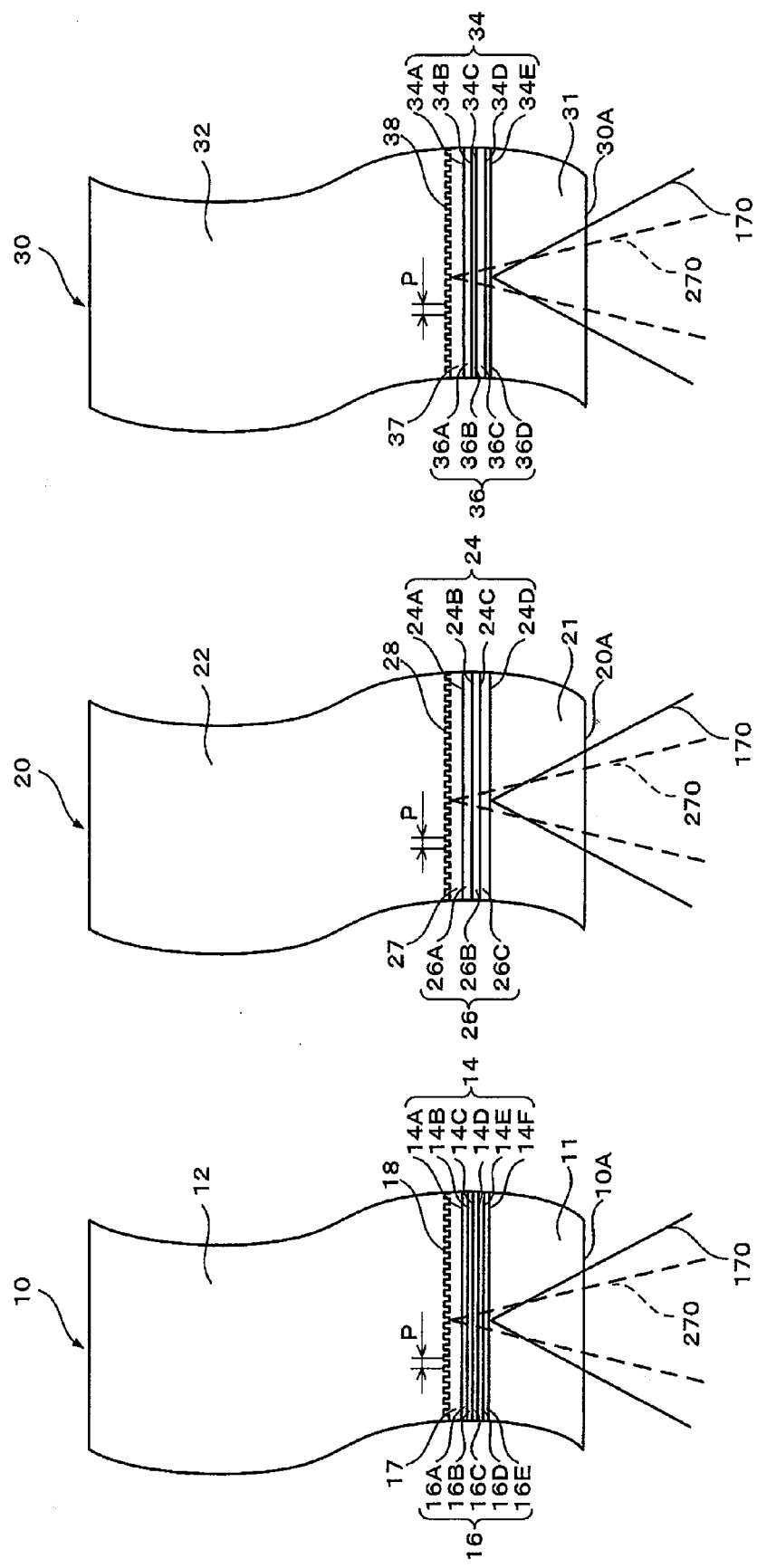
FIG. 2 is a sectional view showing the stacking structures of optical recording media belonging to the series of optical recording media.

FIG. 2 show enlarged cross-sectional structures of first to third optical recording media 10, 20 and 30 belonging to the series of optical recording media of the present embodiment. The first optical recording medium 10 will be described in detail. However, the description of the second and third optical recording media 20 and 30 will be given, focusing on the differences from the first optical recording medium 10. Similar components in the first to third optical recording media 10, 20, and 30 are denoted by reference numerals with the same last digit.

The first optical recording medium 10 has a disc shape having an outer diameter of approximately 120 mm and a thickness of approximately 1.2 mm. The first optical recording medium 10 includes, in order from a light incident surface 10A, a cover layer 11, the recording and reading layer group 14, an intermediate layer group 16, a spacer layer 17, the servo layer 18, and a support substrate 12.

In this embodiment, the recording and reading layer group 14 includes first to sixth recording and reading layers 14A to 14F, and information can be recorded on each recording and reading layer. Each of the first to sixth recording and reading layers 14A to 14F has a flat structure with no projection and depression for tracking control. When any of the first to sixth recording and reading layers 14A to 14F is irradiated with the high-energy recording beam 170 emitted from the first optical system 100, recording marks are formed. The types of the recording and reading layers in the recording and reading layer group 14 include a write-once type in which information can be additionally written but the written information is not rewritable and a rewritable type in which information is rewritable.

The support substrate 12 is a disc-shaped substrate having a diameter of 120 mm and a thickness of 1.0 mm, which is employed to ensure the thickness required for the optical recording medium (about 1.2 mm). The servo layer 18 is formed on a surface of the support substrate 12 that is on the side toward the light incident surface 10A. More specifically, a spiral groove and a spiral land are formed on the support substrate 12 on the side toward the light incident surface 10A so as to extend from the vicinity of its center toward its outer edge. The land and groove serve as a projection and a depression (recess) for tracking control, and the beam 270 from the second optical system 200 is guided by the groove and land.

Various materials can be used as the material for the support substrate 12. For example, glass, ceramic, and resin can be used. It is preferable to use a resin because of its good moldability. Example of the resin include polycarbonate resins, olefin resins, acrylic resins, epoxy resins, polystyrene resins, polyethylene resins, polypropylene resins, silicone resins, fluorine-based resins, ABS resins, and urethane resins. Of these, polycarbonate resins and olefin resins are particularly preferred because of their processability. The support substrate 12 does not serve as an optical path of the beam 270 and therefore need not have high light transmittance.

The servo layer 18 formed on the support substrate 12 is formed by forming projections and depressions (grooves and lands) for tracking control and a reflective layer on the surface of the support substrate 12. The servo layer 18 may be formed as a layer of a metal such as Ag so as to function as a light reflecting film. If necessary, a reflective recordable layer may be provided.

In this embodiment, the track pitch P of the projections and depressions for tracking control in the servo layer 18 is set to a value twice the track pitch of recording marks to be formed on the recording and reading layers 14A to 14F. More specifically, the track pitch of the recording marks to be formed on the recording and reading layers 14A to 14F is about 0.32 µm to support the SD standard. Therefore, the track pitch P of the grooves and lands of the servo layer 18 is set to about 0.64 µm. When the track pitch P is about 0.64 µm, sufficient tracking can be achieved even with the beam 270 having a relatively long wavelength in the red wavelength range. In particular, in the present embodiment, tracking is performed using both the groove and land. Therefore, although the pitch of the projections and depressions is about 0.64 µm, the track pitch of recording marks recorded on the recording and reading layers 14A to 14F can be about 0.32 µm, which is one half of the pitch of the projections and depressions 18A and 19A. Since the track pitch of the recording marks on the recording and reading layer group 14 can be halved without reducing the track pitch of the servo layer 18, the recording capacity can be increased.

The spacer layer 17 is formed of a light-transmitting ultraviolet curable acrylic resin, and the thickness thereof is set to 90 µm in this embodiment.

Each of the first to sixth recording and reading layers 14A to 14F stacked on the spacer layer 17 on the side toward the light incident surface 10A has a three-film structure (not shown) having dielectric films stacked on opposite sides of a write once-type recording film. Each of the first to sixth recording and reading layers 14A to 14F has light reflectance, absorbance, transmittance, and other properties optimized for the beam 170 in the blue wavelength range (short wavelength range) from the first optical system 100 and has wavelength selectivity that allows sufficient transmission of the beam 270 in the red wavelength range (long wavelength range) from the second optical system 200.

The dielectric films in each recording and reading layer have a basic function of protecting the write once type recording film and also play a role in increasing the differences in optical properties before and after the formation of recording marks.

When the beam 170 is applied, the recording sensitivity is likely to decrease if the energy absorbed by the dielectric films is large. To prevent the reduction in the recording sensitivity, it is preferable to select a material having a low absorption coefficient (k) for the wavelength range of 380 nm to 450 nm (particularly at 405 nm) as the material for the dielectric films. In this embodiment, $TiO_2$ is used as the material for the dielectric films.

The write once type recording film sandwiched between the dielectric films is used to form irreversible recording marks, and the regions in which the recording marks have been formed have a reflectance for the beam 170 significantly different from that of the other regions (blank regions). The recording and reading of data are thereby achieved. Also the write once type recording film has high transmittance for the tracking beam 270 in the red wavelength range from the second optical system 200.

The write once type recording film is formed mainly of a material containing Bi and O. The write once type recording film functions as an inorganic reactive film, and its reflectance is largely changed chemically or physically by the heat of a laser beam. Preferred examples of the material for the write once type recording film include materials containing Si and O as main components and materials containing Bi, M, and O as main components (wherein M is at least one element selected from among Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material for the write once type recording film.

In the above description, the write once type recording film is used for each of the first to sixth recording and reading layers 14A to 19F. However, a phase change recording film that allows repeated recording can be used. In such a case, it is preferable to use SbTeGe as the main components of the phase change recording film.

The intermediate layer group 16 includes first to fifth intermediate layers 16A to 16E that are stacked in that order from the side away from the light incident surface 10A and disposed between the first to sixth recording and reading layers 14A to 14F. Each of the intermediate layers 16A to 16E is formed of an ultraviolet curable acrylic or epoxy resin. The thicknesses of the intermediate layers 16A to 16E are 16 μm for the first intermediate layer 16A, 12 μm for the second intermediate layer 16B, 16 μm for the third intermediate layer 16C, 12 μm of the fourth intermediate layer 16D, and 16 μm for the fifth intermediate later 16E. More specifically, two types of intermediate layers having different thicknesses (16 μm and 12 μm) are stacked alternately. Therefore, the interlayer distances between adjacent ones of the first to sixth recording and reading layers 14A to 14F are set alternately to a first distance (16 μm) and a second distance (12 μm) different from the first distance in sequence from the light incident surface side. The difference between the first and second distances is set to 4 μm. In this manner, interlayer crosstalk is reduced.

As in the intermediate layer group 16, the cover layer 11 is formed of a light-transmitting ultraviolet curable acrylic resin, and the thickness thereof is set to 38 μm.

Since the first optical recording medium 10 is configured as described above, the servo layer 18 is positioned at a distance of 0.2 mm (200 μm) from the light incident surface 10A. In the recording and reading layer group 14, the first recording and reading layer 14A, which is farthest from the light incident surface 10A, is positioned at a distance of 0.11 mm (110 μm) from the light incident surface 10A, and the sixth recording and reading layer 14F, which is closest to the light incident surface 10A, is positioned at a distance of 38 μm from the light incident surface 10A. The total thickness of the recording and reading layer group 14 (the distance from the first recording and reading layer 14A to the sixth recording and reading layer 14F) is 72 μm.

Next, a description will be given of the second optical recording medium 20. The second optical recording medium 20 has the same structure as that of the first optical recording medium 10, except that a recording and reading layer group 24 includes four layers (first to fourth recording and reading layers 29A to 24D), and first to third intermediate layers 26A to 26C interposed between these layers have different thicknesses. Specifically, the thicknesses of the first, second, and third intermediate layers 26A, 26B, and 26C are 26 μm for the first intermediate layer 26A, 20 μm for the second intermediate layer 26B, and 26 μm for the third intermediate layer 26C. As a result, the interlayer distances between adjacent ones of the first to fourth recording and reading layers 24A to 24D are set alternately to a first distance (26 μm) and a second distance (20 μm) different from the first distance in sequence from the light incident surface side. The difference between the first and second distances is set at 6 μm.

Accordingly, a servo layer 28 is positioned at a distance of 0.2 mm from a light incident surface 20A. In the recording and reading layer group 24, the first recording and reading layer 24A, which is farthest from the light incident surface 20A, is positioned at a distance of 0.11 mm from the light incident surface 20A, and the fourth recording and reading layer 24D, which is closest to the light incident surface 20A, is positioned at a distance of 38 μm from the light incident surface 20A. The total thickness of the recording and reading layer group 24 (the distance between the first recording and reading layer 24A to the fourth recording and reading layer 24D) is 72 μm.

Next, a description will be given of the third optical recording medium 30. The third optical recording medium 30 has the same structure as that of the first optical recording medium 10, except that a recording and reading layer group 34 includes five layers (first to fifth recording and reading layers 34A to 34E), and first to fourth intermediate layers 36A to 36D interposed between these layers have different thicknesses. Specifically, the thicknesses of the first to fourth intermediate layers 36A to 36D are 20 μm for the first intermediate layer 36A, 16 μm for the second intermediate layer 36B, 20 μm for the third intermediate layer 36C, and 16 μm for the fourth intermediate layer 36D. As a result, the interlayer distances between adjacent ones of the first to fifth recording and reading layers 34A to 34E are set alternately to a first distance (16 μm) and a second distance (20 μm) different from the first distance in sequence from the light incident surface side. The difference between the first and second distances is set at 4 μm.

Accordingly, a servo layer 38 is positioned at a distance of 0.2 mm from a light incident surface 30A. In the recording and reading layer group 34, the first recording and reading layer 34A, which is farthest from the light incident surface 30A, is positioned at a distance of 0.11 mm from the light incident surface 30A, and the fifth recording and reading layer 34E, which is closest to the light incident surface 30A, is positioned at a distance of 38 μm from the light incident surface 30A. The total thickness of the recording and reading layer group 34 (the distance between the first recording and reading layer 34A to the fifth recording and reading layer 34E) is 72 μm.

As described, in the series of optical recording media of the present embodiment, the first to third optical recording media 10, 20 and 30 have different numbers of stacked recording and reading layers. Further, the positions of the servo layers with respect to the corresponding light incident surfaces, the positions of the recording and reading layers with respect to the corresponding light incident surfaces that are nearest the corresponding light incident surfaces, and the positions of the recording and reading layers with respect to the corresponding light incident surfaces that are farthest from the corresponding light incident surfaces, are standardized among the first to third optical recording media 10, 20 and 30.

Each optical recording medium belonging to the series of optical recording media has a standardized position of its servo layer. Accordingly, the second optical system 200 of the optical pickup 90 can easily find the position of a servo layer, thereby realizing tracking control at high speed.

Further, in the series of optical recording media of the present embodiment, the positions of the recording and reading layers nearest the corresponding light incident surfaces are standardized among the first to third optical recording media 10, 20 and 30. Accordingly, the first optical system 100 of the optical pickup 90 can easily place a focus on the recording and reading layers nearest the corresponding light incident surfaces. The positions of the recording and reading layers farthest from the corresponding light incident surfaces are also standardized among the first to third optical recording media 10, 20 and 30. Accordingly, the first optical system 100 of the optical pickup 90 can also easily place a focus on the recording and reading layers farthest from the corresponding light incident surfaces.

Still further, in the series of optical recording media of the present embodiment, the positions of recording and reading layers nearest the corresponding light incident surfaces, and the positions of recording and reading layers farthest from the corresponding light incident surfaces, are both standardized. Thus, the amount of aberration correction by an optical system for recording and reading can be limited. That is, if aberration correction that falls within this limited range is made allowable in the optical pickup 90, recording and reading to and from an optical recording medium is conducted reliably as long as the optical recording medium belongs to the series of optical recording media.

Next, a method of manufacturing the first to third optical recording media 10, 20 and 30 belonging to the series of optical recording media will be described. However, only the method of manufacturing the first optical recording medium 10 will be described, and the description of the methods of manufacturing the second and third optical recording media 20 and 30 is omitted.

First, a support substrate 12 having a groove and land formed thereon is produced by injection molding of a polycarbonate resin and using a metal stamper. The method of producing the support substrate 12 is not limited to injection molding, and any other method such as a 2P method may be used.

Next, the servo layer 18 is formed on the surface of the support substrate 12 on which the groove and land have been formed. The servo layer 18 is formed by forming a reflective metal layer by sputtering using an Ag alloy. Then the spacer layer 17 is formed on the servo layer 18. To form the spacer layer 17, for example, a coating of an ultraviolet curable acrylic or epoxy resin having a controlled viscosity is formed by, for example, spin coating and then irradiated with ultraviolet rays to cure the resin. Instead of using the ultraviolet curable resin, a light-transmitting sheet made of a light-transmitting resin may be fixed onto the servo layer 18 with a bonding agent, an adhesive agent and the like to form the spacer layer 17.

Next, the first recording and reading layer 14A is formed. Specifically, a dielectric film, a write-once recording film, and a dielectric film are formed in this order by a vapor deposition process which is preferably a sputtering process. The first intermediate layer 16A is thereafter formed on the first recording and reading layer 14A. To form the first intermediate layer 16A, for example, a coating of an ultraviolet curable resin having a controlled viscosity is formed by, for example, spin coating and then irradiated with ultraviolet rays to cure the resin. This procedure is repeated to sequentially stack the second recording and reading layer 14B, the second intermediate layer 16B, and the remaining layers that are placed on above another.

After formation of the sixth recording and reading layer 14F, the cover layer 11 is formed on the sixth recording and reading layer 14F to complete the formation of the optical recording medium 10. To form the cover layer 11, for example, a coating of an ultraviolet curable acrylic or epoxy resin having a controlled viscosity is formed by, for example, spin coating and then irradiated with ultraviolet rays to cure the resin. In the present embodiment, the manufacturing method described above is used. However, the present invention is not limited to the manufacturing method described above, and other manufacturing techniques may be used.

Next, a description will be given of a procedure of recording and reading information on/from the optical recording medium 10 belonging to the series of optical recording media by using the optical pickup 90.

In order to record information on the first recording and reading layer 14A of the first optical recording medium 10, the servo layer 18 is first irradiated with the beam 270 in the red wavelength region from the second optical system 200 to perform tracking. Simultaneously with the above operation, the first recording and reading layer 14A is irradiated with the recording beam 170 in the blue wavelength range from the first optical system 100. The basic specifications of a series of optical recording media, and the information about the number of stacked layers that constitute the group of recording and reading layers 14 have been recorded as recorded pits in a BCA (burst cutting area) of the servo layer 18, and are read each time tracking is started. In the present embodiment, the basic information about a series of optical recording media includes the position of the servo layer, the position of recording and reading layers nearest the corresponding light incident surfaces, the positions of recording and reading layers farthest from the corresponding light incident surfaces, and the rules as to the interlayer distances in the recording and reading layer group.

In this series of optical recording media, the position of the servo layer 18 and that of the first recording and reading layer 14A are standardized in advance among the optical recording media as already described. If the optical pickup 90 is made responsive to the basic specifications of the series of optical recording media by reading the basic specifications, the optical pickup 90 can quickly place the focuses of the beams 270 and 170 on the servo layer 18 and the first recording and reading layer 14A, respectively.

Next, information is recorded on the first recording and reading layer 14A while performing tracking by using the servo layer 18. After the recording is completed, additional information (address information of the recording, contents information, and others) is recorded on the servo layer 18, and then the process is completed. If the servo layer 18 has no recording layer, it is desirable that the process be completed after the additional information is recorded on the first recording and reading layer 14A farthest from the light incident surface 10A, or on the sixth recording and reading layer 14F nearest the light incident surface 10A.

In order to record information on the second recording and reading layer 14B, the optical pickup 90 first estimates the position of the second recording and reading layer 14B. In the series of optical recording media, an intermediate layer to define a first thickness, and an intermediate layer to define a second thickness smaller than the first thickness are alternately stacked from a side farther from the light incident surface 10A. Furthermore, a difference between the first and second thicknesses is standardized at 4 μm in the first and third optical recording media 10 and 30, and at 6 μm in the second optical recording medium 20, for example. This rule may be used to estimate the position of the second recording and reading layer 14B by a program with reference to the position of the first recording and reading layer 14A. As an example, in the first optical recording medium 10, a distance between the first and sixth recording and reading layers 14A and 14F is 72 μm, and the recording and reading layer group 14 includes six layers (that is, the intermediate layer group 16 includes five layers). Accordingly, by using a difference of 4 μm in film thickness, the thicknesses of the first, third, and fifth intermediate layers 16A, 16C, and 16E may be calculated as 16 μm, and the thicknesses of the second and fourth intermediate layers 16B and 16D may be calculated as 12 μm. On the basis of the calculation result, the beam 170 of the first optical system 100 is focused directly on the second recording and reading layer 14B to record information on the second recording and reading layer 14B. Tracking by using the second optical system 200 continues during the recording. After the recording, the additional information is recorded on the servo layer 18, and then the process is completed.

Next, in order to read information recorded, for example, on the first recording and reading layer 14A, the servo layer 18 is read first by using the beam 270 of the second optical system 200, thereby reading the above basic specifications and the additional information based on the recording (such as the contents information recorded on the first recording and reading layer 14A). Then, on the basis of these pieces of information, the first recording and reading layer 14A is accessed at a predetermined address by using the beam 170 of the first optical system 100 to perform reading. It is obvious at this time that the information is already recorded on the first recording and reading layer 14A. Accordingly, tracking may be realized by using the corresponding recording mark. This makes the beam 270 of the second optical system 200 unnecessary during the reading of contents from the first recording and reading layer 14A.

As described above, according to the series of optical recording media of the present embodiment, the optical recording media 10, 20 and 30 of different numbers of recording and reading layers each include a plurality of recording and reading layers of a planer structure, and a servo layer in which projections and depressions for tracking control are formed thereon. Furthermore, the positions of the servo layers with respect to the corresponding light incident surfaces are standardized among the first to third optical recording media 10, 20 and 30. Accordingly, the optical pickup 90 can place a focus directly on a servo layer of an optical recording medium by the second optical system 200 as long as the optical recording medium belongs to the series of optical recording media, so that tracking can be started quickly. At the same time, the positions of the recording and reading layers that are nearest the corresponding light incident surfaces, with respect to the corresponding light incident surfaces are standardized among the first to third optical recording media 10, 20 and 30. Accordingly, the first optical system 100 can place a focus directly on the recording and reading layers. This produces a synergistic effect together with the above tracking control to realize reliable recording at high speed.

In the series of optical recording media, the positions of the recording and reading layers that are farthest from the corresponding light incident surfaces, with respect to the corresponding light incident surfaces are standardized among the first to third optical recording media 10, 20 and 30. Accordingly, the first optical system 100 can place a focus directly on the farthest recording and reading layers. This means that the optical pickup 90 knows in advance the positions of the recording and reading layers nearest the corresponding light incident surfaces, and the positions of the recording and reading layers farthest from the corresponding light incident surfaces. Accordingly, even if the optical recording media 10, 20 and 30 of different numbers of recording and reading layers are set in place for the optical pickup 90, generation of recording and reading errors is considerably reduced independently of the number of recording and reading layers. Furthermore, limitations imposed in advance on a range of positions of recording and reading layers make it possible to enhance recording and reading accuracy for all the optical recording media 10, 20, and 30, as long as the optical pickup 90 capable of conducting aberration correction falling within this limited range is prepared. This leads to reduction in cost for manufacturing the optical pickup 90.

In particular, in each one of the first to third optical recording media 10, 20 and 30, the first distance and the second distance different from the first distance are alternately set as interlayer distances between adjacent ones of the recording and reading layers. This means that a fixed rule is defined about interlayer distances between adjacent ones of recording and reading layers, making it possible for the optical pickup 90 to estimate the positions of recording and reading layers by calculation, so that speed of recording and reading can be increased.

In the series of optical recording media, a servo layer of an optical recording medium is disposed away from the corresponding light incident surface by a distance greater than that of a recording and reading layer group. This reduces an adverse effect to be exerted by projections and depressions for tracking control on the beam 170 for recording and reading to and from recording and reading layers, thereby enhancing recording and reading accuracy to a greater degree.

Further, in the series of optical recording media, a track pitch of projections and depressions for tracking defined in the servo layer is set to a value twice the track pitch of a recording and reading layer group for recording. If an inexpensive red beam 270 of a long wavelength can be used for the servo layer to perform tracking using both lands and grooves, recording can be performed on a recording and reading layer at a track pitch one-half that of the servo layer can be performed. In particular, the track pitch of the servo layer is set to 0.64 µm, and accordingly, existing products for the DVD standard can be used as the second optical system 200 with almost no change. The track pitch of the recording and reading layer is 0.32 µm. Therefore, existing products for the BD standard can be used as the first optical system 100 with almost no change. No additional development expense is required for the optical pickup 90, and the optical pickup 90 can be applied to the series of optical recording media while existing parts can be effectively used.

The series of optical recording media of the present embodiment includes three types of optical recording media with different numbers of stacked layers that constitute recording and reading layer groups, to which the invention is not limited. In the invention, the series may include optical recording media of two types, or optical recording media of four or more types. The numbers of stacked layers of recording and reading layer groups are limited to four, five and sixth, to which the invention is not limited.

In the series of optical recording media of the present embodiment, a servo layer is disposed away from a light incident surface by a distance greater than that of a recording and reading layer group, to which the invention is not limited. Alternatively, in the invention, the servo layer may be disposed away from the light incident surface by a distance smaller than that of the group of recording and reading layers.

Furthermore, in the series of optical recording media of the present embodiment, interlayer distances between adjacent ones of recording and reading layers are limited to the first and second distances that are alternately defined, to which the invention is not limited. Interlayer distances of three types of more may be defined where appropriate.

The series of optical recording media of the invention is applicable to various types of optical recording media each with a servo layer and a recording and reading layer.

The entire disclosure of Japanese Patent Application No. 2010-035813 filed on Feb. 22, 2010 including specification, claims, drawings, and summary are incorporated herein by reference in its entirety.

What is claimed is:

1. A series of disc shape optical recording media comprising a plurality of optical recording media, all of the optical recording media including a plurality of planar recording and reading layers with no projections and depressions for tracking control, and a servo layer with projections and depressions for tracking control, thereby recording information on the recording and reading layers while conducting tracking control by using the servo layer,
the plurality of optical recording media have different numbers of stacked planar recording and reading layers,
the plurality of optical recording media have a support substrate which is disposed farther from a light incident surface than the plurality of planar recording and reading layers,
the stacked planar recording and reading layers of the plurality of optical recording media are read and written by a same optical pickup,
the plurality of optical recording media have the same position among the plurality of optical recording media of the servo layers with respect to the corresponding light incident surfaces, and wherein
a first fixed distance is set to a fixed first numerical value and a second fixed distance is set to a fixed second numerical value;
interlayer distances of the stacked planar recording and reading layers alternate between the fixed first distance and the second fixed distance for adjacent ones of the recording and reading layers in the stack in each of the plurality of optical recording media.

2. A series of disc shape optical recording media comprising a plurality of optical recording media, all of the optical recording media including a plurality of planar recording and reading layers with no projections and depressions for tracking control, and a servo layer with projections and depressions for tracking control, thereby recording information on the recording and reading layers while conducting tracking control by using the servo layer,
the plurality of optical recording media have different numbers of stacked planar recording and reading layers,
the plurality of optical recording media have a support substrate which is disposed farther from a light incident surface than the plurality of planar recording and reading layers,
the stacked planar recording and reading layers of the plurality of optical recording media are read and written by a same optical pickup,
the plurality of optical recording media have the same position among the plurality of optical recording media of the servo layers with respect to the corresponding light incident surfaces,
the positions of the planar recording and reading layers that are farthest from the corresponding light incident surfaces, with respect to the corresponding light incident surfaces are the same position among the plurality of optical recording media;
wherein a first fixed distance is set to a fixed first numerical value and a second fixed distance is set to a fixed second numerical value;
interlayer distances of the stacked planar recording and reading layers alternate between the fixed first distance and the second fixed distance for adjacent ones of the recording and reading layers in the stack in each of the plurality of optical recording media.

3. A series of disc shape optical recording media comprising a plurality of optical recording media, all of the optical recording media including a plurality of planar recording and reading layers with no projections and depressions for tracking control, and a servo layer with projections and depressions for tracking control, thereby recording information on the recording and reading layers while conducting tracking control by using the servo layer,
the plurality of optical recording media have different numbers of stacked planar recording and reading layers,
the plurality of optical recording media have a support substrate which is disposed farther from a light incident surface than the plurality of planar recording and reading layers,
the stacked planar recording and reading layers of the plurality of optical recording media are read and written by a same optical pickup,
the plurality of optical recording media have the same position among the plurality of optical recording media of the servo layers with respect to the corresponding light incident surfaces, and
the servo layer of the optical recording medium is disposed away from the corresponding light incident surface by a distance greater than that of the corresponding plurality of recording and reading layers,
wherein a first fixed distance is set to a fixed first numerical value and a second fixed distance is set to a fixed second numerical value;
interlayer distances of the stacked planar recording and reading layers alternate between the fixed first distance and the second fixed distance for adjacent ones of the recording and reading layers in the stack in each of the plurality of optical recording media.

4. A series of disc shape optical recording media comprising a plurality of optical recording media, all of the optical recording media including a plurality of planar recording and reading layers with no projections and depressions for tracking control, and a servo layer with projections and depressions for tracking control, thereby recording information on the recording and reading layers while conducting tracking control by using the servo layer,
the plurality of optical recording media have different numbers of stacked planar recording and reading layers,
the plurality of optical recording media have a support substrate which is disposed farther from a light incident surface than the plurality of planar recording and reading layers,
the stacked planar recording and reading layers of the plurality of optical recording media are read and written by a same optical pickup,
the plurality of optical recording media have the same position among the plurality of optical recording media of the servo layers with respect to the corresponding light incident surfaces,
the positions of the planar recording and reading layers that are farthest from the corresponding light incident surfaces, with respect to the corresponding light incident surfaces are the same position among the plurality of optical recording media,
the servo layer of the optical recording medium is disposed away from the corresponding light incident surface by a distance greater than that of the corresponding plurality of recording and reading layers, and
wherein a first fixed distance is set to a fixed first numerical value and a second fixed distance is set to a fixed second numerical value;
interlayer distances of the stacked planar recording and reading layers alternate between the fixed first distance and the second fixed distance for adjacent ones of the recording and reading layers in the stack in each of the plurality of optical recording media.

5. The series of disc shape optical recording media according to claim 1, wherein a track pitch of the projections and depressions for tracking control defined in the servo layer is twice a track pitch of recording marks to be recorded on the recording and reading layers.

6. The series of disc shape optical recording media according to claim 2, wherein a track pitch of the projections and depressions for tracking control defined in the servo layer is twice a track pitch of recording marks to be recorded on the recording and reading layers.

7. The series of disc shape optical recording media according to claim 3, wherein a track pitch of the projections and depressions for tracking control defined in the servo layer is twice a track pitch of recording marks to be recorded on the recording and reading layers.

8. The series of disc shape optical recording media according to claim 4, wherein a track pitch of the projections and depressions for tracking control defined in the servo layer is twice a track pitch of recording marks to be recorded on the recording and reading layers.

9. The series of disc shape optical recording media according to claim 1, wherein the positions of the planar recording and reading layers that are nearest from the corresponding light incident surfaces, with respect to the corresponding light incident surfaces are the same position among the plurality of optical recording media.

* * * * *